United States Patent [19]

Puckace et al.

[11] Patent Number: 5,595,963
[45] Date of Patent: Jan. 21, 1997

[54] SYNERGISTIC ANTIOXIDANT COMBINATIONS FOR LUBRICATING OILS

[75] Inventors: James S. Puckace, Perrineville; David J. Martella, Princeton, both of N.J.

[73] Assignee: Exxon Chemical Patents Inc., Linden, N.J.

[21] Appl. No.: 349,335

[22] Filed: Dec. 5, 1994

[51] Int. Cl.$^6$ .................................................. C10M 135/22
[52] U.S. Cl. ............................ 508/421; 508/569; 508/577
[58] Field of Search ........................ 252/49.8, 45, 52 R; C10M 135/22

[56] References Cited

U.S. PATENT DOCUMENTS

| | | | |
|---|---|---|---|
| 2,009,480 | 7/1935 | Craig | 18/50 |
| 2,346,153 | 4/1944 | Dennison et al. | 252/45 |
| 2,858,274 | 10/1958 | Matuszak et al. | 252/48.6 |
| 3,010,937 | 11/1961 | Roos et al. | 260/45.7 |
| 3,478,107 | 11/1969 | Vineyard | 260/609 |
| 4,707,300 | 11/1987 | Sturm et al. | 252/404 |
| 4,735,980 | 4/1988 | Sturm et al. | 524/246 |
| 4,963,276 | 10/1990 | Evans | 252/47.5 |
| 5,078,893 | 1/1992 | Ryer et al. | 252/49.8 X |
| 5,156,759 | 10/1992 | Culpon Jr. | 252/52 R |
| 5,202,384 | 4/1993 | Pyke et al. | 525/167 |
| 5,288,418 | 2/1994 | Farng et al. | 252/49.9 |

OTHER PUBLICATIONS

Kirk–Othmer Encyclopedia of Chemical Technology, 4th edition, John Wiley & Sons, 1992, excerpts from pp. 431, 433, 426, and 432 month unknown.

*Primary Examiner*—Prince Willis, Jr.
*Assistant Examiner*—Cephia D. Toomer
*Attorney, Agent, or Firm*—T. J. Shatynski

[57] ABSTRACT

This invention provides synergistic combinations of dithioketals with hindered phenols, phosphite esters, or mixtures thereof. These combinations are useful antioxidants in lubricating oils.

10 Claims, No Drawings

SYNERGISTIC ANTIOXIDANT COMBINATIONS FOR LUBRICATING OILS

BACKGROUND OF THE INVENTION

1. Field of the Invention

This invention is concerned with novel lubricating oil antioxidants, particularly those comprising a synergistic combination of dithioketals and phenolic or phosphite ester antioxidants.

2. Discussion of Related Art

A desired property of lubricating oils is its ability to withstand the effects of oxidation. Among the ill effects of lubricating oil oxidation are increases in the viscosity of the lubricant, development of acidic contaminants, and the formation of carbonaceous matter. Thus, there is a need for compositions and methods that increase a lubricating oil's resistance to oxidation.

Various compositions have been suggested as antioxidants in art areas other than the lubricating oil arts. For example, U.S. Pat. No. 3,010,937 discloses that thioacetals are useful antioxidizing agents in polymers, particularly, polyolefins. Linear and branched dialkyl thioformals are included as examples of thioacetals.

U.S. Pat. No. 4,735,980 discloses that methylene bis (alkylsulfides) behave as antioxidant synergists in rubber when combined with phenolic and amine type antioxidants.

Although these references teach the usefulness of the aforementioned compounds as antioxidants for stabilizing polymers such as rubber, the references neither teach nor suggest the synergistic combinations of this invention for use as lubricating oil antioxidants.

In the art of lubricating oils, U.S. Pat. No. 3,478,107 discloses that branched-chain alkyl formaldehyde mercaptals of the formula R'—S—CH$_2$—S—R", where R' and R" are independently branched-chain C$_3$—C$_4$ alkyl radicals, are useful antiwear additives in lubricating oils. However, this reference neither discloses or suggests this invention's synergistic combination of dithioketals with phenolic or phosphite ester antioxidants. In fact, the surprising nature of this invention is not only demonstrated by the oxidation induction times reported herein, but also by the observation that the dithioketal synergistic effect is achieved with only select compounds possessing antioxidant characteristics.

SUMMARY OF THE INVENTION

One embodiment of this invention concerns a lubricating oil additive combination comprising:
(A) a dithioketal represented by structure (I)

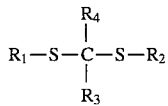

where:
R$_1$, R$_2$, R$_3$, and R$_4$ are the same or different, and are hydrogen or a C$_1$–C$_{30}$ hydrocarbyl group; and
(B) a hindered phenol, phosphite ester, or mixtures thereof.

Other embodiments of this invention include a lubricating oil and lubricating oil concentrate comprising the additive combination of this invention.

Another embodiment relates to a method for improving the oxidative stability of lubricating oils by incorporating an effective amount of the additive combination of this invention.

DETAILED DESCRIPTION OF THE INVENTION

Component (A)

The dithioketals represented by structure (I) form a broad description of dithioketals useful in this invention. For purposes of this invention, the term dithioketal is intended to include dithioformals (i.e., when R$_3$ and R$_4$ are both hydrogen) and dithioacetals (i.e., when either R$_3$ or R$_4$ is hydrogen).

The R$_1$, R$_2$, R$_3$ and R$_4$ groups are the same or different and are hydrogen or a straight-chained, branched, or cyclic hydrocarbyl group. Representative hydrocarbyl groups include alkyl, alkenyl, cycloalkyl, aralkyl, alkaryl, and their hetero-containing analogs.

The hetero-containing hydrocarbyl groups may contain one or more hetero atoms. A variety of hetero atoms can be used and are readily apparent to those skilled in the art. Suitable hetero atoms include, but are not limited to, nitrogen, oxygen, phosphorus, and sulfur.

When the hydrocarbyl group is alkyl, straight-chained alkyl groups are preferred—typically those that are about C$_2$ to C$_{18}$, preferably about C$_4$ to C$_{12}$, most preferably about C$_6$ to C$_{10}$ alkyl. When the hydrocarbyl group is alkenyl, straight-chained alkenyl groups are preferred—typically those that are about C$_3$ to C$_{18}$, preferably about C$_6$ to C$_{10}$ alkenyl. When the hydrocarbyl group is cycloalkyl, the group typically has about 5 to 18 carbon atoms, preferably about 5 to 16, most preferably about 5 to 12. When the hydrocarbyl group is aralkyl and alkaryl, the aryl portion typically contains about C$_6$ to C$_{12}$, preferably 6 carbon atoms, and the alkyl portion typically contains about 0 to 18 carbon atoms, preferably 1 to 10.

Straight-chained hydrocarbyl groups are preferred over branched or cyclic groups. However, if the hydrocarbyl group constitutes the less preferred cycloalkyl group, it may be substituted with a C$_1$ to C$_{18}$ straight-chained alkyl group, preferably C$_2$ to C$_8$.

Representative examples of suitable hydrocarbyl groups for structure I include methyl, ethyl, propyl, butyl, pentyl, hexyl, heptyl, octyl, 2-ethylhexyl, isooctyl, tertiary-octyl, nonyl, isononyl, tertiary-nonyl, secondary nonyl, decyl, isodecyl, undecyl, dodecyl, tridecyl, palmityl, stearyl, isostearyl, octenyl, nonenyl, decenyl, dodecenyl, oleyl, linoleyl and linolenyl, cyclooctyl, enzyl, octylphenyl, dodecylphenyl, and phenyloctyl.

The preferred hydrocarbyl groups for R$_1$ and R$_2$ of structure (I) are hexyl, octyl, nonyl, decyl, undecyl, and dodecyl. R$_3$ and R$_4$ are preferably hydrogen.

Dithioketals of structure (I) may be prepared by conventional methods widely known in the art. For example, a dithioketal is produced by the condensation reaction of mercaptans containing the desired hydrocarbyl group (i.e., for R$_1$ and R$_2$) with aldehydes or ketones in the presence of acid catalysts.

Suitable mercaptan reactants include hydrogen sulfide, methyl mercaptan, ethyl mercaptan, propyl mercaptal, n-butyl mercaptan, tert.-butyl mercaptan, nonyl mercaptan, n-dodecyl mercaptan, tert.-dodecyl mercaptan, isodecyl mercaptan, benzyl mercaptan, thiophenol, thiocresol and α- and β-thionaphthol.

Suitable aldehyde reactants include formaldehyde, acetaldehyde, propionaldehyde, n-butyraldehyde, isobutyraldehyde, heptylaldehyde, benzaldehyde, salicylaldehyde, p-hydroxy benzaldehyde, furfurol, glyoxal, and terephthalaldehyde.

Suitable ketone reactants include acetone, butanone, methyl-ethyl ketone, diethyl ketone, methyl isopropyl ketone, methyl isobutyl ketone, amyl methyl ketone, cyclopentanone, dihexyl ketone, and acetophenone.

Thus, a preferred dithioketal may be prepared by the following reaction equation:

$$R_1SH + R_2SH + formaldehyde \rightarrow R_1SCH_2SR_2$$

where $R_1$ and $R_2$ are defined above.

Component (B)

Component (B) may be a hindered phenol, phosphite ester, or mixtures thereof.

i) Hindered Phenols

Suitable hindered phenol antioxidants include ortho-alkylated phenolic compounds and methylene bridged alkylphenols. Examples of the ortho-alkylated phenolic compounds are 2,6-di-tert-butylphenol, 4-methyl-2,6-di-tert-butylphenol, 2,4,6-tri-tert-butylphenol, 2-tert-butylphenol, 2,6-di-isopropylphenol, 2 methyl-6-tert-butyl-phenol, 2,4-dimethyl-6-tert-butylphenol, 4-(N,N-dimethylaminomethyl)-2,6-di-tert-butylphenol, 4-ethyl-2,6-di-tert-butylphenol, 2-methyl-6-styrylphenol, 2,6-di-styryl-4-nonylphenol, and their analogs and homologs. Mixtures of two or more such mononuclear phenolic compounds are also suitable.

The methylene bridged alkylphenols can be used singly or in combinations with each other, or in combinations with sterically-hindered unbridged phenolic compounds. Illustrative methylene bridged compounds include 4,4'-methylenebis(6-tert-butyl-o-cresol), 4,4'-methylenebis(2-tert-amyl-o-cresol), 2,2'-methylenebis(4-methyl-6-tert-butylphenol), 4,4'-methylenebis(2,6-di-tert-butylphenol), and their derivatives.

The preferred hindered phenols are butylated hydroxy toluene (BHT), butylated hydroxy anisole (BHA), or their derivatives.

ii) Phosphite Esters

The phosphite esters which may be used in this invention comprise one or more mono-, di- or tri-hydrocarbyl phosphites, one or more mono- or di-hydrocarbyl thiophosphites, or one or more hydrocarbyl thiol-containing phosphites. Mixtures of any of these phosphites may be used.

The phosphite esters have the structure:

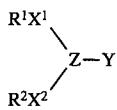

wherein Z is >P(X)— or >P—; Y is H or $X^3R^3$; $R^1$, $R^2$, and $R^3$ are each independently H or hydrocarbyl containing 1 to 30 carbon atoms, and $X^1$, $X^2$, $X^3$ and X are independently S or O, with the provisos that Y is H when Z is >P(X)—, and that when $X^1$ and $X^2$ are S, and Z is >P—, and Y is —$SR^3$. For purposes of this invention, the term phosphite esters is intended to be used interchangeably with the term hydrocarbyl phosphites.

Examples of the hydrocarbyl phosphite compounds which may be used in this invention include at least one compound of the formula:

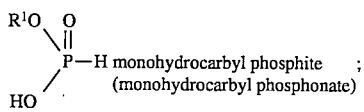

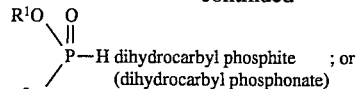

wherein $R^1$, $R^2$ and $R^3$ can be the same or different and are hydrocarbyl generally of from 1 to 30, preferably from 4 to 18, carbon atoms.

The hydrocarbyl thiophosphite compounds which may be used include:

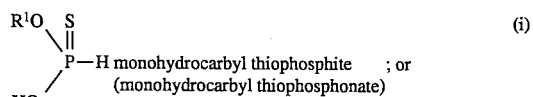

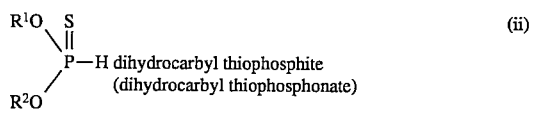

wherein R1 and R2 are the same or different and are defined above.

The hydrocarbyl thiol-containing phosphite compounds which may be used include at least one compound of the formula:

As used in the specification and appended claims, the terms "hydrocarbyl" or "hydrocarbon-based" denote a group having a carbon atom directly attached to the remainder of the molecule and having predominantly hydrocarbon character within the context of this invention. Such groups include the following:

(1) Hydrocarbon groups; that is, aliphatic, (e.g., alkyl or alkenyl), alicyclic (e.g., cycloalkyl or cycloalkenyl), aromatic, aliphatic- and alicyclic-substituted aromatic, aromatic-substituted aliphatic and alicyclic groups, and the like, as well as cyclic groups wherein the ring is completed through another portion of the molecule (that is, any two indicated substituents may together form an alicyclic group). Such groups are known to those skilled in the art. Examples include methyl, ethyl, octyl, decyl, ocytadecyl, cyclohexyl, phenyl, etc.

(2) Substituted hydrocarbon groups; that is, groups containing non-hydrocarbon substituents which, in the context of this invention, do not alter the predominantly hydrocarbon character of the group. Those skilled in the art will be aware of suitable substituents. Examples include halo, hydroxy, nitro, cyano, alkoxy, acyl, etc.

(3) Hetero groups; that is, groups which, while predominantly hydrocarbon in character within the context of this invention, contain atoms other than carbon in a chain or ring otherwise composed of carbon atoms. Suitable hetero atoms will be apparent to those skilled in the art and include, for example, nitrogen, oxygen and sulfur. In general, no more than about three substituents or hetero atoms, and preferably no more than one, will be present for each 10 carbon atoms in the hydrocarbyl group.

Terms such as "alkyl-based group", "aryl-based group" and the like have meaning analogous to the above with respect to alkyl and aryl groups and the like.

The hydrocarbyl groups $R^1$ and $R^2$ may be the same or different hydrocarbyl groups, and generally, the total number of carbon atoms in $R^1$ and $R^2$ will be at least about 4. In a preferred embodiment the hydrocarbyl groups will contain from 4 to about 30 carbon atoms each, and preferably from about 8 to about 20 carbon atoms each. The hydrocarbyl groups $R^1$ and $R^2$ may be aliphatic or aromatic such as alkyl, aryl, alkaryl, aralkyl and alicyclic hydrocarbon groups. Examples of $R^1$ and $R^2$ groups include ethyl, n-butyl, n-hexyl, 2-ethylhexyl, 1-nonyl, 1-decyl, 1-dodecyl, 1-tetradecyl, stearyl, 1-hexadecyl, 1-octadecyl, oleyl, linoleyl, linolenyl, phytyl, myricyl, lauryl, cetyl, behenyl, etc. Examples of aromatic hydrocarbyl groups include phenyl, octylphenyl, nonylphenyl, and groups derived from similarly alkylated naphthols. Examples of alicyclic hydrocarbons include cyclohexyl, methylcyclohexyl, etc.

The $R^1$ and $R^2$ groups may each comprise a mixture of hydrocarbyl groups derived from commercial alcohols. Higher synthetic monohydric alcohols of the type formed by Oxo process (e.g., 2-ethylhexyl), the Aldol condensation, or by organo aluminum-catalyzed oligomerization of alpha-olefins (especially ethylene), followed by oxidation and hydrolysis, also are useful. Examples of some preferred monohydric alcohols and alcohol mixtures include the commercially available "Alfol" alcohols marketed by Continental Oil Corporation. Alfol 810 is a mixture containing alcohols consisting essentially of straight chain, primary alcohols having from 8 to 10 carbon atoms. Alfol 12 is a mixture comprising mostly $C_{12}$ fatty alcohols. Alfol 1218 is a mixture of synthetic, primary, straight-chain alcohols having 12 to 18 carbon atoms. The Alfol 20+ alcohols are mixtures of $C_{18}$–$C_{28}$ primary alcohols having mostly, on an alcohol basis, $C_{20}$ alcohols as determined by GLC (gas-liquid-chromatography). The Alfol 22+ alcohols are $C_{18}$–$C_{28}$ primary alcohols having mostly, on an alcohol basis, $C_{22}$ alcohols. These Alfol alcohols can contain a fairly large percentage (up to 40% by weight) of paraffinic compounds which can be removed before the reaction if desired.

Another example of a commercially available alcohol mixture is Adol 60 which comprises about 75% by weight of a straight chain $C_{22}$ primary alcohol, about 15% of a $C_{20}$ primary alcohol and about 8% of $C_{18}$ and $C_{24}$ alcohols. Adol 320 comprises predominantly oleyl alcohol. The Adol alcohols are marketed by Ashland Chemical.

A variety of mixtures of monohydric fatty alcohols derived from naturally occurring triglycerides and ranging in chain length of from $C_8$ to $C_{18}$ are available from Procter & Gamble Company. These mixtures contain various amounts of fatty alcohols containing mainly 12, 14, 16, or 18 carbon atoms. For example, CO-1214 is a fatty alcohol mixture containing 0.5% of $C_{10}$ alcohol, 66.0% of $C_{12}$ alcohol, 26.0% of $C_{14}$ alcohol and 6.5% of $C_{16}$ alcohol.

Another group of commercially available mixtures include the "Neodol" products available from Shell Chemical Co. For example, Neodol 23 is a mixture of $C_{12}$ and $C_{13}$ alcohols; Neodol 25 is a mixture of $C_{12}$ and $C_{15}$ alcohols; and Neodol 45 is a mixture of $C_{14}$ and $C_{15}$ linear alcohols. Neodol 91 is a mixture of $C_9$, $C_{10}$ and $C_{11}$ alcohols.

Fatty vicinal diols also are useful and these include those available from Ashland Oil under the general trade designation Adol 114 and Adol 158. The former is derived from a straight chain alpha olefin fraction of $C_{11}$–$C_{14}$, and the latter is derived form a $C_{15}$–$C_{18}$ fraction.

The acids are usually prepared by reacting $P_2O_5$ or $P_2S_5$ with the desired alcohol or thiol to obtain the substituted phosphorus-containing acids.

The desired hydroxy or thiol compound should contain hydrocarbyl groups of from about 8 to about 70 carbon atoms with preferably about 15 total carbon atoms average to provide oil solubility to the product. Examples of suitable compounds are hexyl alcohol, 2-ethylhexyl alcohol, nonyl alcohol, dodecyl alcohol, stearyl alcohol, amylphenol, octylphenol, nonylphenol, methcyclohexanol, alkylated naphthol, etc., and their corresponding thio analogues; and mixtures of alcohols and/or phenols such as isobutyl alcohol and nonyl alcohol; orthocresol and nonylphenol; etc., and mixtures of their corresponding thio analogues.

In the preparation of the hydrocarbyl-substituted thiophosphoric acids, any conventional method can be used, such as, the preparation described in U.S. Pat. No. 2,552,570; 2,579,038; and 2,689,220. By way of illustration, a dialkaryl-substituted dithiophosphoric acid is prepared by the reaction of about 2 moles of $P_2S_5$ with about 8 moles of a selected alkylated phenyl, e.g., a mixture of $C_8$–$C_{12}$ alkyl-substituted phenols, i.e., nonyl phenol, at a temperature of from 50° C. to 125° C. for about 4 hours. For the preparation of hydrocarbyl-substituted thiophosphinic acids, such as conventionally known disubstituted thiophosphinic acids, see F. C. Witmore's Organic Chemistry", published by Dover Publications, New York, N.Y. (1961) page 848.

Particularly preferred for preparation of oil-soluble phosphoric, phosphonic and phosphinic acids useful in the process of the invention are mixed aliphatic alcohols obtained by the reaction of olefins of carbon monoxide and hydrogen and substituted hydrogenation of the resultant aldehydes which are commonly known as "Oxo" alcohols, which Oxo alcohols for optimum use according to this invention will contain an average of about 13 carbon atoms, such as di-$C_{13}$ Oxo phosphoric acid. The oil-soluble phosphorus-containing acids are readily prepared from these alcohols by reaction with $P_2O_5$ as is well known in the art.

Preferred herein are hydrocarbyl phosphites having the formula

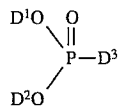

wherein $D^1$ is H or a hydrocarbyl group containing 1 to 18 carbon atoms, $D^2$ is a hydrocarbyl group containing 1 to 18 carbon atoms, and $D^3$ is H or an oxyhydrocarbyl group containing 1 to 18 carbon atoms. More preferred are hydrocarbyl phosphites wherein $D^1$ is H or a hydrocarbyl group containing from 4 to 8 carbon atoms, $D^3$ is H or an oxyhydrocarbyl group containing from 4 to 8 carbon atoms. $D^1$ may be an alkyl, alkenyl, aryl, aralkyl, alkaryl or cycloalkyl group, preferably an alkyl group such as a methyl, ethyl, butyl, hexyl, octyl, decyl, tetradecyl, octadecyl, eicosyl or triacontyl group. It may be an ethenyl, butenyl, octenyl or oleyl group. $D^2$ may also be an alkyl, alkaryl, or $C^6$ aryl group, including methyl, ethyl, propyl, butyl, pentyl, hexyl, the unsaturated members thereof, and phenyl. $D^3$ can be —$OD^2$ wherein $D^2$ is as defined above. Preferably the unsaturated members contain only double bonds. Examples of useful phosphites are the dimethyl, diethyl, dibutyl, methylethyl, hexyl, tetradecyl phosphites, and the like.

The phosphites employed in this invention can be made using a single diol or mixtures of two or more diols. Such mixtures can contain from about 5% to about 95% by weight of any one constituent, the other constituent(s) being selected such that it or they together comprise from about 95% to about 5% by weight of the mixture. Mixtures are often preferred to the single-member component. The phosphite reaction can be performed at about 70° C. to about 250° C., with about 100° C. to about 160° C. being preferred. Less than a stoichiometric amount of phosphite can be used and is often preferred to a stoichiometric amount.

The more preferred phosphites are the mono-, di- and tri-hydrocarbon esters of phosphorous acid. Examples of these are: dimethyl phosphite, dibutyl phosphite, ethylmethyl phosphite, diheptylphosphite, dicyclohexylphosphite, triphenyl phosphite, tri-(pentylphenyl) phosphite, tri-(dipentylphenyl) phosphite, didecyl phosphite, di-stearyl phosphite, tri-(hexapropylene-substituted phenyl) phosphite, trihexyl phosphite, tri-tert-butyl phosphite, di-(heptylphenyl) phosphite, and tri-(m-chloro-p-heptylphenyl) phosphite. Most preferred are dibutyl phosphite, tributyl phosphite, triphenyl phosphite, or mixtures thereof.

While any effective ratios of Component (A) to Component (B) are contemplated by this invention, typically the molar ratio of Component (A) to Component (B) ranges from 1:10 to 10:1; preferably 1:4 to 4:1; most preferably 1:2 to 2:1.

The additive combination of this invention may be added to a lubricating oil basestock in an amount sufficient to impart antioxidation properties. The typical range is 0.05 to 2.0 weight percent of 100% active ingredient, preferably 0.2 to 1.0 weight percent, most preferably 0.4 to 0.7 weight percent.

It may be desirable to include a source of boron with the combination of this invention in the lubrication oil basestock. The presence of boron tends to lessen the deterioration of silicone-based seals. The boron source may be present in the form of borated dispersants, borated amines, borated alcohols, borated esters, or alkyl borates.

Accordingly, by adding an effective amount of this invention's combination to a lubricating oil and then placing the resulting lubrication oil within a lubrication system, the oil will function as a method of inhibiting oxidation in a lubrication oil system.

The lubrication oil basestock may contain one or more additives to form a fully formulated lubricating oil. Such lubricating oil additives include corrosion inhibitors, detergents, pour point depressants, antioxidants, extreme pressure additives, viscosity improvers, friction modifiers, and the like. These additives are typically disclosed in, for example, "Lubricant Additives" by C. V. Smalheer and R. Kennedy Smith, 1967, pp. 1–11 and in U.S. Pat. No. 4,105,571, the disclosures of which are incorporated herein by reference. A fully formulated lubricating oil normally contains from about 1 to about 20 weight % of these additives. Borated or unborated dispersants may also be included as additives in the oil, if desired. However, the precise additives used (and their relative amounts) will depend upon the particular application of the oil. Contemplated applications for formulations of this invention include passenger car motor oils, gear oils, industrial oils, lubricating oils, and power transmission fluids, especially automatic transmission fluids and tractor hydraulic fluids. The following list shows representative amounts of additives in lubrication oil formulations:

| Additive | (Broad) Wt. % | (Preferred) Wt. % |
| --- | --- | --- |
| VI Improvers | 1–12 | 1–4 |
| Corrosion Inhibitor/ Passivators | 0.01–3 | 0.01–1.5 |
| Anti-Oxidants | 0.01–5 | 0.01–1.5 |

-continued

| Additive | (Broad) Wt. % | (Preferred) Wt. % |
| --- | --- | --- |
| Dispersants | 0.10–10 | 0.1–8 |
| Anti-Foaming Agents | 0.001–5 | 0.001–1.5 |
| Detergents | 0.01–6 | 0.01–3 |
| Anti-Wear Agents | 0.001–5 | 0.001–1.5 |
| Pour Point Depressants | 0.01–1.5 | 0.01–1.5 |
| Seal Swellants | 0.01–8 | 0.1–6 |
| Friction Modifiers | 0.01–3 | 0.01–1.5 |
| Lubricating Base Oil | Balance | Balance |

Particularly suitable detergent additives for use with this invention include ash-producing basic salts of Group I (alkali) or Group II (alkaline) earth metals and transition metals with sulfonic acids, carboxylic acids, or organic phosphorus acids.

The additive combination of this invention may also be blended with other additives to form a concentrate. A concentrate will generally contain a major portion of this invention's additive combination together with other desired additives and a minor amount of lubrication oil or other solvent. The additive combination and desired additives (i.e., active ingredients) are provided in the concentrate in specific amounts to give a desired concentration in a finished formulation when combined with a predetermined amount of lubrication oil. The collective amounts of active ingredient in the concentrate typically are from about 0.2 to 50, preferably from about 0.5 to 20, most preferably from 2 to 20 weight % of the concentrate, with the remainder being a lubrication oil basestock or a solvent.

Suitable lubrication oil basestocks can be derived from natural lubricating oils, synthetic lubricating oils, or mixtures thereof. In general, the lubrication oil basestock will have a viscosity in the range of about 5 to about 10,000 $mm^2/s$ (cSt) at 40° C., although typical applications will require an oil having a viscosity ranging from about 10 to about 1,000 $mm^2/s$ (cSt) at 40° C.

Natural lubricating oils include animal oils, vegetable oils (e.g., castor oil and lard oil), petroleum oils, mineral oils, and oils derived from coal or shale.

Synthetic oils include hydrocarbon oils and halo-substituted hydrocarbon oils such as polymerized and interpolymerized olefins (e.g., polybutylenes, polypropylenes, propylene-isobutylene copolymers, chlorinated polybutylenes, poly(1-hexenes), poly(1-octenes), poly(1-decenes), etc., and mixtures thereof); alkylbenzenes (e.g., dodecylbenzenes, tetradecylbenzenes, dinonylbenzenes, di(2-ethylhexyl)benzene, etc.); polyphenyls (e.g., biphenyls, terphenyls, alkylated polyphenyls, etc.); alkylated diphenyl ethers, alkylated diphenyl sulfides, as well as their derivatives, analogs, and homologs thereof; and the like.

Synthetic lubricating oils also include alkylene oxide polymers, interpolymers, copolymers, and their derivatives where the terminal hydroxyl groups have been modified by esterification, etherification, etc. This class of synthetic oils is exemplified by polyoxyalkylene polymers prepared by polymerization of ethylene oxide or propylene oxide; the alkyl and aryl ethers of these polyoxyalkylene polymers (e.g., methyl-polypropylene glycol having a molecular weight of 1000–1500); and mono- and poly-carboxylic esters thereof (e.g., the acetic acid esters, mixed $C_3$–$C_8$ fatty acid esters, and $C_{13}$ oxo acid diester of tetraethylene glycol).

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids, etc.) with a variety of alcohols (e.g., butyl alcohol, hexyl alcohol, dodecyl alcohol, 1-ethylhexyl alcohol, ethylene glycol, di-ethylene glycol monoether, propylene glycol, etc.). Specific examples of these esters include dibutyl adipate, di(2-ethylhexyl) sebacate, di-n-hexyl fumarate, dioctyl sebacate, diisooctyl azelatic, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid, and the like.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol, tripentaerythritol and the like. Synthetic hydrocarbon oils are also obtained from hydrogenated oligomers of normal olefins.

Silicone-based oils (such as the polyalkyl-, polyaryl-, polyalkoxy-, or polyaryloxy-siloxane oils and silicate oils) comprise another useful class of synthetic lubricating oils. These oils include tetraethyl silicate, tetraisopropyl silicate, tetra-(2-ethylhexyl) silicate, tetra-(4-methyl-2-ethylhexyl) silicate, tetra(p-tert-butylphenyl) silicate, hex-(4-methyl-2-pentoxy)-disiloxane, poly(methyl)-siloxanes and poly-(methylphenyl) siloxanes, and the like. Other synthetic lubricating oils include liquid esters of phosphorus-containing acids (e.g., tricresyl phosphate, trioctyl phosphate, and diethyl ester of decylphosphonic acid), polymeric tetrahydroforans, polyalphaolefins, and the like.

The lubricating oil may be derived from unrefined, refined, rerefined oils, or mixtures thereof. Unrefined oils are obtained directly from a natural source or synthetic source (e.g., coal, shale, or tar sands bitumen) without further purification or treatment. Examples of unrefined oils include a shale oil obtained directly from a retorting operation, a petroleum oil obtained directly from distillation, or an ester obtained directly from an esterification process, each of which is then used without further treatment. Refined oils are similar to the unrefined oils except that refined oils have been treated in one or more purification steps to improve one or more properties. Suitable purification techniques include distillation, hydrotreating, dewaxing, solvent extraction; acid or base extraction, filtration, and percolation, all of which are known to those skilled in the art. Rerefined oils are obtained by treating refined oils in processes similar to those used to obtain the refined oils. These rerefined oils are also known as reclaimed or reprocessed oils and often are additionally processed by techniques for removal of spent additives and oil breakdown products.

This invention may be further understood by reference to the following examples which are not intended to restrict the scope of the appended claims.

EXAMPLES

Preparative Examples

Preparation of 9, 11 Dithiononadecane

Two (2) molar equivalents (292 g) of n-octylthiol, 250 ml. of water, and 5 ml. of concentrated hydrochloric acid were placed into a four-necked flask equipped with an addition funnel, a reflux condenser, a thermometer, and a pneumatic stirrer. One (1) molar equivalent (81 g) of aqueous formalin was slowly introduced into the flask through the addition funnel while the temperature of the flask mixture was monitored to prevent a potential runaway exothermic reaction. Once addition of the formalin was completed, the flask mixture was slowly raised to approximately 70° C. and then stirred for approximately 1 to 2 hours. The mixture was then cooled to room temperature which caused the desired product to separate into an organic upper phase. The organic phase was separated by decanting, neutralized with a 5 weight percent sodium bicarbonate wash, washed with water, dried over a sodium sulfate desiccant, and then filtered after 24 hours. The product was a clear yellowish liquid measured to contain 21.05 weight percent sulfur.

Performance Examples

Fourteen test formulations, A–N, were prepared to demonstrate this invention. All of the formulations contained a basestock and conventional amounts of borated and unborated succinimide dispersants, tolyltriazole, amide and ethoxylated amine friction modifiers, viscosity modifier and antifoamant.

The oxidation stability of the test formulations were measured according to the thin-film oxygen uptake test (TFOUT). In the TFOUT, an oil sample is placed in a glass vessel and mixed with an oxidized, nitrated gasoline fuel, a mixed-metal catalyst and water. The glass vessel is then sealed in a test bomb and pressurized to 620 kPa with pure oxygen. The bomb is placed in a constant temperature bath at 160° C. and rotated axially at a speed of 100 rpm. The bomb pressure is monitored as a function of time. A rapid decrease in oxygen pressure indicates that the oil sample is oxidizing. The time required for the oil to oxidize is called the oxidation induction time. Thus, a comparison of various induction times indicates which oil samples contain the stronger antioxidant.

The results of the TFOUT for formulations A–N are reported in Table 1.

TABLE 1

| | TFOUT RESULTS | | | | |
|---|---|---|---|---|---|
| | ADDITIVES (mM) | | | | INDUCTION |
| Formulation | 9,11 DTND[1] | BHA[2] | TPP[3] | DPA[4] | TIME (min) |
| A | 33.2 | — | — | — | 32 |
| B | 66.4 | — | — | — | 43 |
| C | — | 33.2 | — | — | 10 |
| D | — | 66.4 | — | — | 17 |
| E | — | 99.6 | — | — | 12 |
| F | — | 132.8 | — | — | 12 |
| G | 33.2 | 16.6 | — | — | >219[5] |
| H | 33.2 | 33.2 | — | — | >238[5] |
| I | 16.6 | 33.2 | — | — | 71 |
| J | — | — | 33.2 | — | 10 |
| K | 16.6 | — | 33.2 | — | >274[5] |
| L | 33.2 | — | 33.2 | — | >280[5] |
| M | — | — | — | 33.2 | 29, 30 |
| N | 33.2 | — | — | 33.2 | 37, 41 |

Notes:
1 - 9,11 Dithiononadecane
2 - Butylated Hydroxy Anisole
3 - Triphenyl Phosphite
4 - Dioctyl Diphenylamine
5 - Test stopped at this point; could have run longer.

Table 1 demonstrates the synergistic antioxidative behavior of the combination of a dithioketal with a hindered phenol or a phosphite ester.

For example, Formulations A and B show that compositions containing the dithioketal, 9,11 dithiononadecane (9,11

DTND), alone have induction times of only 32 minutes and 43 minutes when present in the amounts of 33.2 and 66.4 mM, respectively. Similarly, Formulations C–F, have induction times ranging from 10–17 minutes for compositions containing the hindered phenol, butylated hydroxy anisole (BHA), alone. However, Formulations G–I demonstrate that when 9,11 DTND and BHA are combined, the induction times range from 71 to 238 minutes. It appears that in the case of a dithioketal and phenolic compound combination, the best synergies are achieved when the dithioketal is present in an amount at least equal to or greater than the amount of hindered phenol.

Similarly, the synergistic nature of the dithioketal and phosphite ester combination is apparent when referring to Table 1. For example, Formulation J, containing the phosphite ester, triphenyl phosphite (TPP), only has an induction time of 10 minutes. However, when 9,11 DTND and TPP are combined as in Formulations K and L, the induction times are >274 minutes. It appears that in the case of a dithioketal and phosphite ester combination, the extremely strong synergies are achieved even when the dithioketal is present in an amount less than the amount of phosphite ester.

Finally, Formulations M and N demonstrate that the dithioketal synergistic effect is not present with all compounds possessing antioxidative characteristics. Formulation M shows that the aromatic amine antioxidant, dioctyl diphenylamine (DPA), possesses induction times ranging from 29–30 minutes when present in the amount of 32.2 mM. Formulation N shows that when 9,11 DTND is combined with DPA in equal amounts, induction times ranging from 37 to 41 minutes are measured. Thus, the surprising increase in antioxidative behavior is not present in this combination as compared to the dithioketal combinations with the hindered phenol and phosphite ester.

What is claimed is:

1. A lubricating oil additive combination comprising:

(A) a dithioketal represented by structure (I)

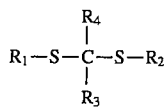 (I)

where:

$R_1$, $R_2$, $R_3$, and $R_4$ are the same or different, and are hydrogen or a $C_1$–$C_{30}$ hydrocarbyl group; and (B) a hindered phenol, phosphite ester, or mixtures thereof;

wherein the molar ratio of (A) to (B) is in the synergistic effective range of from about 1:4 to 4:1.

2. The additive of claim 1, where the hindered phenol is butylated hydroxy anisole, butylated hydroxy toluene, or mixtures thereof.

3. The additive of claim 1, where the phosphite ester is dibutyl phosphite, tributyl phosphite, triphenyl phosphite, or mixtures thereof.

4. The additive combination of claim 1, where $R_1$ and $R_2$ are both linear alkyl, $R_3$ and $R_4$ are hydrogen, the phenol is butylated hydroxy anisole, and the phosphite ester is triphenylphosphite.

5. The additive combination of claim 4, where $R_1$ and $R_2$ are $C_9$ alkyl.

6. A lubricating oil composition comprising:

(A) a major amount of lubricating oil; and (B) an antioxidative effective amount of the additive combination of claim 1.

7. A lubricating oil concentrate comprising:

(A) a major amount of conventional lubricating oil additives and the additive of claim 1, and (B) a minor amount of lubricating oil.

8. A method for improving the oxidative stability of a lubricating oil comprising incorporating into a lubricating oil antioxidative effective amount of the additive combination of claim 1.

9. The method of claim 8, wherein the lubricating oil is a power transmitting fluid.

10. The method of claim 9, wherein the power transmitting fluid is an automatic transmission fluid.

* * * * *